United States Patent
Salomonsson et al.

(10) Patent No.: US 11,667,252 B2
(45) Date of Patent: *Jun. 6, 2023

(54) VEHICULAR VISION SYSTEM WITH WINDSHIELD MOUNTED CAMERA

(71) Applicant: MAGNA ELECTRONICS INC., Auburn Hills, MI (US)

(72) Inventors: Ove J. Salomonsson, Farmington Hills, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,831

(22) Filed: Aug. 29, 2022

(65) Prior Publication Data

US 2022/0410815 A1 Dec. 29, 2022

Related U.S. Application Data

(63) Continuation of application No. 17/305,254, filed on Jul. 2, 2021, now Pat. No. 11,427,136, which is a
(Continued)

(51) Int. Cl.
*B60R 11/04* (2006.01)
*B60R 1/00* (2022.01)
(Continued)

(52) U.S. Cl.
CPC .............. *B60R 11/04* (2013.01); *B60Q 1/143* (2013.01); *B60R 1/00* (2013.01); *G02B 5/20* (2013.01);
(Continued)

(58) Field of Classification Search
None
See application file for complete search history.

(56) References Cited

U.S. PATENT DOCUMENTS

| 4,514,530 A | 4/1985 | Sellstrom et al. |
| 4,634,884 A | 1/1987 | Hayashimoto et al. |

(Continued)

FOREIGN PATENT DOCUMENTS

| CN | 01059596 A | 3/1992 |
| CN | 1743887 A | 3/2006 |

(Continued)

OTHER PUBLICATIONS

International Search Report and Written Opinion dated Jul. 23, 2012 for corresponding PCT Application No. PCT/US2012/34236.

*Primary Examiner* — Eileen M Adams
(74) *Attorney, Agent, or Firm* — Honigman LLP

(57) ABSTRACT

A vehicular vision system includes a camera module configured for mounting at an in-cabin portion of a windshield of a vehicle and including a circuit board and a camera that views forward of the vehicle and through the windshield. The camera includes an imaging sensor array. A data processor is operable to process image data captured by the imaging sensor array for at least one system of the vehicle. The imaging sensor array is electrically connected to circuitry of the circuit board via a flexible electrical connection. The imaging sensor array may be controlled via the flexible electrical connection. Image data captured by the imaging sensor array is carried via the flexible electrical connection. With the camera module mounted at the in-cabin portion of the windshield, the circuit board is tilted at an acute angle relative to the longitudinal axis of a lens barrel of the camera.

72 Claims, 3 Drawing Sheets

Related U.S. Application Data continuation of application No. 17/247,269, filed on Dec. 7, 2020, now Pat. No. 11,052,834, which is a continuation of application No. 16/948,878, filed on Oct. 5, 2020, now Pat. No. 10,857,953, which is a continuation of application No. 16/806,095, filed on Mar. 2, 2020, now Pat. No. 10,793,086, which is a continuation of application No. 16/449,546, filed on Jun. 24, 2019, now Pat. No. 10,576,909, which is a continuation of application No. 16/117,105, filed on Aug. 30, 2018, now Pat. No. 10,328,868, which is a continuation of application No. 15/878,579, filed on Jan. 24, 2018, now Pat. No. 10,065,575, which is a continuation of application No. 15/494,646, filed on Apr. 24, 2017, now Pat. No. 9,878,679, which is a continuation of application No. 15/180,643, filed on Jun. 13, 2016, now Pat. No. 9,630,570, which is a continuation of application No. 14/112,343, filed as application No. PCT/US2012/034236 on Apr. 19, 2012, now Pat. No. 9,380,219.

(60) Provisional application No. 61/477,315, filed on Apr. 20, 2011.

(51) Int. Cl.
*H04N 23/51* (2023.01)
*H04N 23/70* (2023.01)
*G02B 5/20* (2006.01)
*G03B 11/00* (2021.01)
*B60Q 1/14* (2006.01)
*B60R 11/00* (2006.01)

(52) U.S. Cl.
CPC .............. *G03B 11/00* (2013.01); *H04N 23/51* (2023.01); *H04N 23/749* (2023.01); *B60R 2011/0026* (2013.01); *B60R 2300/00* (2013.01); *B60R 2300/804* (2013.01); *B60R 2300/8086* (2013.01); *B60R 2300/8093* (2013.01)

(56) References Cited

U.S. PATENT DOCUMENTS

| | | | |
|---|---|---|---|
| 4,712,879 A | 12/1987 | Lynam et al. | |
| 4,786,966 A | 11/1988 | Hanson et al. | |
| 5,073,012 A | 12/1991 | Lynam | |
| 5,076,673 A | 12/1991 | Lynam et al. | |
| 5,096,287 A * | 3/1992 | Kakinami | B60R 1/12 352/132 |
| 5,098,287 A | 3/1992 | Duncan et al. | |
| 5,115,346 A | 5/1992 | Lynam | |
| 5,130,804 A | 7/1992 | Tamura | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,204,615 A | 4/1993 | Richards et al. | |
| 5,253,109 A | 10/1993 | O'Farrell et al. | |
| 5,371,659 A | 12/1994 | Pastrick et al. | |
| 5,406,414 A | 4/1995 | O'Farrell et al. | |
| 5,497,306 A | 3/1996 | Pastrick | |
| 5,525,264 A | 6/1996 | Cronin et al. | |
| 5,550,677 A | 8/1996 | Schofield et al. | |
| 5,559,556 A | 9/1996 | Kagebeck | |
| 5,567,360 A | 10/1996 | Varaprasad et al. | |
| 5,610,756 A | 3/1997 | Lynam et al. | |
| 5,657,539 A | 8/1997 | Orikasa et al. | |
| 5,668,663 A | 9/1997 | Varaprasad et al. | |
| 5,669,699 A | 9/1997 | Pastrick et al. | |
| 5,670,935 A | 9/1997 | Schofield et al. | |
| 5,724,187 A | 3/1998 | Varaprasad et al. | |
| 5,760,962 A | 6/1998 | Schofield et al. | |
| 5,796,094 A | 8/1998 | Schofield et al. | |
| 5,821,532 A | 10/1998 | Beaman et al. | |
| 5,823,654 A | 10/1998 | Pastrick et al. | |
| 5,854,708 A | 12/1998 | Komatsu et al. | |
| 5,872,332 A | 2/1999 | Verma | |
| 5,877,897 A | 3/1999 | Schofield et al. | |
| 5,910,854 A | 6/1999 | Varaprasad et al. | |
| 5,920,061 A | 7/1999 | Feng | |
| 5,949,331 A | 9/1999 | Schofield et al. | |
| 5,978,017 A | 11/1999 | Tino | |
| 6,002,511 A | 12/1999 | Varaprasad et al. | |
| 6,013,372 A | 1/2000 | Hayakawa et al. | |
| 6,071,606 A | 6/2000 | Yamazaki et al. | |
| 6,072,814 A | 6/2000 | Ryan et al. | |
| 6,087,953 A | 7/2000 | DeLine et al. | |
| 6,097,023 A | 8/2000 | Schofield et al. | |
| 6,117,193 A | 9/2000 | Glenn | |
| 6,124,886 A | 9/2000 | DeLine et al. | |
| 6,151,065 A | 11/2000 | Steed et al. | |
| 6,154,306 A | 11/2000 | Varaprasad et al. | |
| 6,172,613 B1 | 1/2001 | DeLine et al. | |
| 6,176,602 B1 | 1/2001 | Pastrick et al. | |
| 6,178,034 B1 | 1/2001 | Allemand et al. | |
| 6,193,378 B1 | 2/2001 | Tonar et al. | |
| 6,201,642 B1 | 3/2001 | Bos | |
| 6,222,447 B1 | 4/2001 | Schofield et al. | |
| 6,243,003 B1 | 6/2001 | DeLine et al. | |
| 6,250,148 B1 | 6/2001 | Lynam | |
| 6,259,475 B1 | 7/2001 | Ramachandran et al. | |
| 6,276,821 B1 | 8/2001 | Pastrick et al. | |
| 6,278,377 B1 | 8/2001 | DeLine et al. | |
| 6,292,311 B1 | 9/2001 | Bohn et al. | |
| 6,302,545 B1 | 10/2001 | Schofield et al. | |
| 6,313,454 B1 | 11/2001 | Bos et al. | |
| 6,320,176 B1 | 11/2001 | Schofield et al. | |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,353,392 B1 | 3/2002 | Schofield et al. | |
| 6,396,397 B1 | 5/2002 | Bos et al. | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,454,449 B2 | 9/2002 | Nestell et al. | |
| 6,466,136 B2 | 10/2002 | DeLine et al. | |
| 6,481,003 B1 | 11/2002 | Maeda | |
| 6,483,101 B1 | 11/2002 | Webster | |
| 6,498,620 B2 | 12/2002 | Schofield et al. | |
| 6,501,387 B2 | 12/2002 | Skiver et al. | |
| 6,523,964 B2 | 2/2003 | Schofield et al. | |
| 6,535,242 B1 | 3/2003 | Strumolo et al. | |
| 6,559,435 B2 | 5/2003 | Schofield et al. | |
| 6,559,439 B1 | 5/2003 | Tsuchida et al. | |
| 6,587,152 B1 | 7/2003 | Sharp et al. | |
| 6,590,658 B2 | 7/2003 | Case et al. | |
| 6,593,565 B2 | 7/2003 | Heslin et al. | |
| 6,603,612 B2 | 8/2003 | Nakano | |
| 6,611,202 B2 | 8/2003 | Schofield et al. | |
| 6,651,187 B2 | 11/2003 | Lacey, III | |
| 6,654,187 B2 | 11/2003 | Ning | |
| 6,690,268 B2 | 2/2004 | Schofield et al. | |
| 6,717,610 B1 | 4/2004 | Bos et al. | |
| 6,757,109 B2 | 6/2004 | Bos | |
| 6,768,422 B2 | 7/2004 | Schofield et al. | |
| 6,774,356 B2 | 8/2004 | Heslin et al. | |
| 6,795,237 B1 | 9/2004 | Marinelli et al. | |
| 6,805,767 B2 | 10/2004 | Shinomiya | |
| 6,806,452 B2 | 10/2004 | Bos et al. | |
| 6,822,563 B2 | 11/2004 | Bos et al. | |
| 6,824,281 B2 | 11/2004 | Schofield et al. | |
| 6,831,261 B2 | 12/2004 | Schofield et al. | |
| 6,891,563 B2 | 5/2005 | Schofield et al. | |
| 6,897,432 B2 | 5/2005 | Schmidtke et al. | |
| 6,946,978 B2 | 9/2005 | Schofield | |
| 6,953,253 B2 | 10/2005 | Schofield et al. | |
| 6,968,736 B2 | 11/2005 | Lynam | |
| 6,977,619 B2 | 12/2005 | March et al. | |
| 7,004,593 B2 | 2/2006 | Weller et al. | |
| 7,004,606 B2 | 2/2006 | Schofield | |

(56) References Cited

U.S. PATENT DOCUMENTS

| | | |
|---|---|---|
| 7,005,974 B2 | 2/2006 | McMahon et al. |
| 7,015,944 B2 | 3/2006 | Holz et al. |
| 7,031,075 B2 | 4/2006 | Tsuji |
| 7,038,577 B2 | 5/2006 | Pawlicki et al. |
| 7,095,123 B2 | 8/2006 | Prior |
| 7,095,572 B2 | 8/2006 | Lee et al. |
| 7,111,996 B2 | 9/2006 | Seger et al. |
| 7,123,168 B2 | 10/2006 | Schofield |
| 7,188,963 B2 | 3/2007 | Schofield et al. |
| 7,205,904 B2 | 4/2007 | Schofield |
| 7,215,479 B1 | 5/2007 | Bakin |
| 7,255,451 B2 | 8/2007 | McCabe et al. |
| 7,262,406 B2 | 8/2007 | Heslin et al. |
| 7,265,342 B2 | 9/2007 | Heslin et al. |
| 7,268,957 B2 | 9/2007 | Frenzel et al. |
| 7,289,037 B2 | 10/2007 | Uken et al. |
| 7,311,406 B2 | 12/2007 | Schofield et al. |
| 7,325,934 B2 | 2/2008 | Schofield et al. |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | DeWind et al. |
| 7,388,182 B2 | 6/2008 | Schofield et al. |
| 7,391,458 B2 | 6/2008 | Sakamoto |
| 7,402,786 B2 | 7/2008 | Schofield et al. |
| 7,419,315 B2 | 9/2008 | Hirata et al. |
| 7,420,159 B2 | 9/2008 | Heslin et al. |
| 7,423,248 B2 | 9/2008 | Schofield et al. |
| 7,423,665 B2 | 9/2008 | Ray et al. |
| 7,425,076 B2 | 9/2008 | Schofield et al. |
| 7,453,509 B2 | 11/2008 | Losehand et al. |
| 7,480,149 B2 | 1/2009 | DeWard et al. |
| 7,526,103 B2 | 4/2009 | Schofield et al. |
| 7,533,998 B2 | 5/2009 | Schofield et al. |
| 7,536,316 B2 | 5/2009 | Ozer et al. |
| 7,538,316 B2 | 5/2009 | Heslin et al. |
| 7,551,103 B2 | 6/2009 | Schofield |
| 7,579,939 B2 | 8/2009 | Schofield et al. |
| 7,599,134 B2 | 10/2009 | Bechtel et al. |
| 7,616,781 B2 | 11/2009 | Schofield et al. |
| 7,655,894 B2 | 2/2010 | Schofield et al. |
| 7,679,498 B2 | 3/2010 | Pawlicki et al. |
| 7,697,027 B2 | 4/2010 | McMahon et al. |
| 7,728,721 B2 | 6/2010 | Schofield et al. |
| 7,768,574 B2 | 8/2010 | Humpston |
| 7,877,175 B2 | 1/2011 | Higgins-Luthman |
| 7,888,629 B2 | 2/2011 | Heslin et al. |
| 7,889,086 B2 | 2/2011 | Schafer et al. |
| 7,916,009 B2 | 3/2011 | Schofield et al. |
| 7,918,570 B2 | 4/2011 | Weller et al. |
| 7,946,505 B2 | 5/2011 | Lynam et al. |
| 7,965,336 B2 | 6/2011 | Single et al. |
| 7,972,045 B2 | 7/2011 | Schofield |
| 7,994,462 B2 | 8/2011 | Schofield et al. |
| 8,063,759 B2 | 11/2011 | Bos et al. |
| 8,064,146 B2 | 11/2011 | Iwasaki |
| 8,070,332 B2 | 12/2011 | Higgins-Luthman et al. |
| 8,090,153 B2 | 1/2012 | Schofield et al. |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,179,437 B2 | 5/2012 | Schofield et al. |
| 8,192,095 B2 | 6/2012 | Kortan et al. |
| 8,194,133 B2 | 6/2012 | DeWind et al. |
| 8,203,440 B2 | 6/2012 | Schofield et al. |
| 8,222,588 B2 | 7/2012 | Schofield et al. |
| 8,223,203 B2 | 7/2012 | Ohsumi et al. |
| 8,239,086 B2 | 8/2012 | Higgins-Luthman |
| 8,254,011 B2 | 8/2012 | Baur et al. |
| 8,256,821 B2 | 9/2012 | Lawlor et al. |
| 8,289,142 B2 | 10/2012 | Pawlicki et al. |
| 8,294,608 B1 | 10/2012 | Lynam |
| 8,314,689 B2 | 11/2012 | Schofield et al. |
| 8,318,512 B2 | 11/2012 | Shah et al. |
| 8,324,552 B2 | 12/2012 | Schofield et al. |
| 8,325,986 B2 | 12/2012 | Schofield et al. |
| 8,339,453 B2 | 12/2012 | Blake, III et al. |
| 8,355,839 B2 | 1/2013 | Schofield et al. |
| 8,376,595 B2 | 2/2013 | Higgins-Luthman |
| 8,386,114 B2 | 2/2013 | Higgins-Luthman |
| 8,405,725 B2 | 3/2013 | McMahon et al. |
| 8,405,726 B2 | 3/2013 | Schofield et al. |
| 8,451,332 B2 | 5/2013 | Rawlings |
| 8,513,590 B2 | 8/2013 | Heslin et al. |
| 8,529,075 B2 | 9/2013 | Yamada et al. |
| 8,531,278 B2 | 9/2013 | DeWard et al. |
| 8,534,887 B2 | 9/2013 | DeLine et al. |
| 8,542,451 B2 | 9/2013 | Lu et al. |
| 8,548,315 B2 | 10/2013 | Okuda |
| 8,629,768 B2 | 1/2014 | Bos et al. |
| 8,665,079 B2 | 3/2014 | Pawlicki et al. |
| 8,743,203 B2 | 6/2014 | Karner et al. |
| 8,763,970 B2 | 7/2014 | Mordau et al. |
| 8,851,690 B2 | 10/2014 | Uken et al. |
| 8,944,655 B2 | 2/2015 | Verrat-Debailleul et al. |
| 9,150,165 B1 | 10/2015 | Fortin et al. |
| 9,156,403 B2 | 10/2015 | Rawlings et al. |
| 9,193,308 B2 | 11/2015 | Okuda |
| 9,266,474 B2 | 2/2016 | DeWard et al. |
| 9,277,104 B2 | 3/2016 | Sesti et al. |
| 9,338,334 B2 | 5/2016 | Lu et al. |
| 9,380,219 B2 | 6/2016 | Salomonsson et al. |
| 9,451,138 B2 | 9/2016 | Winden et al. |
| 9,487,159 B2 | 11/2016 | Achenbach |
| 9,497,368 B1 | 11/2016 | Winden et al. |
| 9,596,387 B2 | 3/2017 | Achenbach et al. |
| 9,630,570 B2 | 4/2017 | Salomonsson et al. |
| 9,635,230 B2 | 4/2017 | Winden et al. |
| 9,871,971 B2 | 1/2018 | Wang et al. |
| 9,878,679 B2 | 1/2018 | Salomonsson et al. |
| 9,883,088 B2 | 1/2018 | Winden et al. |
| 10,033,934 B2 | 7/2018 | Wang et al. |
| 10,046,716 B2 | 8/2018 | Okuda et al. |
| 10,065,575 B2 * | 9/2018 | Salomonsson ......... G03B 11/00 |
| 10,264,168 B2 | 4/2019 | Winden et al. |
| 10,277,825 B2 | 4/2019 | Wang et al. |
| 10,328,868 B2 * | 6/2019 | Salomonsson ........... G02B 5/20 |
| 10,462,375 B2 | 10/2019 | Wang et al. |
| 10,576,909 B2 * | 3/2020 | Salomonsson ......... B60Q 1/143 |
| 10,793,086 B2 | 10/2020 | Salomonsson et al. |
| 10,857,953 B1 * | 12/2020 | Salomonsson ......... G03B 11/00 |
| 11,052,834 B2 * | 7/2021 | Salomonsson ............ B60R 1/00 |
| 11,427,136 B2 | 8/2022 | Salomonsson et al. |
| 2002/0003571 A1 | 1/2002 | Schofield et al. |
| 2002/0156559 A1 | 10/2002 | Stam et al. |
| 2002/0159270 A1 | 10/2002 | Lynam et al. |
| 2003/0090569 A1 | 5/2003 | Poechmueller |
| 2003/0137595 A1 | 7/2003 | Takachi |
| 2003/0169522 A1 | 9/2003 | Schofield et al. |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0189862 A1 | 9/2004 | Gustavsson et al. |
| 2005/0083590 A1 | 4/2005 | Tanigawa et al. |
| 2005/0104995 A1 | 5/2005 | Spryshak et al. |
| 2005/0141106 A1 | 6/2005 | Lee et al. |
| 2005/0184352 A1 | 8/2005 | Jeong et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gaily et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2006/0202038 A1 | 9/2006 | Wang et al. |
| 2007/0096020 A1 | 5/2007 | Mitsugi et al. |

(56) References Cited

U.S. PATENT DOCUMENTS

| | | |
|---|---|---|
| 2007/0109406 A1 | 5/2007 | Schofield et al. |
| 2007/0120657 A1 | 5/2007 | Schofield et al. |
| 2007/0221826 A1* | 9/2007 | Bechtel ............... G02B 13/0025 250/208.1 |
| 2007/0279518 A1 | 12/2007 | Apel et al. |
| 2008/0024833 A1 | 1/2008 | Kawasaki |
| 2008/0024883 A1 | 1/2008 | Iwasaki |
| 2008/0043105 A1 | 2/2008 | Kallhammer et al. |
| 2008/0121034 A1 | 5/2008 | Lynam et al. |
| 2008/0247751 A1 | 10/2008 | Lang et al. |
| 2008/0252882 A1* | 10/2008 | Kesterson ............... G02B 5/208 356/300 |
| 2009/0010494 A1 | 1/2009 | Bechtel et al. |
| 2009/0046150 A1 | 2/2009 | Hayakawa et al. |
| 2009/0085755 A1 | 4/2009 | Schafer et al. |
| 2009/0208058 A1 | 8/2009 | Schofield et al. |
| 2009/0244361 A1 | 10/2009 | Gebauer et al. |
| 2009/0295181 A1 | 12/2009 | Lawlor et al. |
| 2010/0103308 A1 | 4/2010 | Butterfield et al. |
| 2010/0110192 A1 | 5/2010 | Johnston et al. |
| 2010/0118146 A1 | 5/2010 | Schofield et al. |
| 2010/0134616 A1 | 6/2010 | Seger et al. |
| 2010/0165468 A1 | 7/2010 | Yamada et al. |
| 2010/0279438 A1 | 11/2010 | An et al. |
| 2010/0279439 A1 | 11/2010 | Shah et al. |
| 2010/0283581 A1 | 11/2010 | Heigl |
| 2011/0025850 A1 | 2/2011 | Maekawa et al. |
| 2011/0035120 A1 | 2/2011 | Taylor et al. |
| 2011/0163904 A1 | 7/2011 | Alland et al. |
| 2011/0233248 A1 | 9/2011 | Flemming et al. |
| 2011/0298968 A1 | 12/2011 | Tseng et al. |
| 2012/0008129 A1 | 1/2012 | Lu et al. |
| 2012/0013741 A1 | 1/2012 | Blake, III et al. |
| 2012/0069185 A1 | 3/2012 | Stein |
| 2012/0075471 A1 | 3/2012 | Seger et al. |
| 2012/0081550 A1 | 4/2012 | Sewell |
| 2012/0182425 A1 | 7/2012 | Higgins-Luthman et al. |
| 2012/0207461 A1 | 8/2012 | Okuda |
| 2012/0265416 A1 | 10/2012 | Lu et al. |
| 2013/0002873 A1 | 1/2013 | Hess |
| 2013/0044021 A1 | 2/2013 | Lynam |
| 2014/0000804 A1 | 1/2014 | Looi et al. |
| 2014/0015977 A1* | 1/2014 | Taylor ............... G01C 21/365 348/148 |
| 2014/0016919 A1 | 1/2014 | Okuda |
| 2014/0022657 A1 | 1/2014 | Lu et al. |
| 2014/0043465 A1 | 2/2014 | Salomonsson et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0042798 A1 | 2/2015 | Takeda |
| 2015/0251605 A1 | 9/2015 | Uken et al. |
| 2017/0182944 A1 | 6/2017 | Achenbach et al. |
| 2017/0187931 A1 | 6/2017 | Onishi et al. |

FOREIGN PATENT DOCUMENTS

| | | |
|---|---|---|
| CN | 101681530 A | 3/2010 |
| CN | 101799614 A | 8/2010 |
| DE | 102008044003 A1 | 5/2010 |
| DE | 102010023593 A1 | 12/2011 |
| EP | 0889801 A1 | 1/1999 |
| EP | 1025702 A1 | 8/2000 |
| EP | 1271214 A1 | 1/2003 |
| EP | 1351316 A2 | 10/2003 |
| EP | 1504276 A2 | 2/2005 |
| EP | 1605520 A1 | 12/2005 |
| JP | 08084277 | 3/1996 |
| JP | 2006-293100 A | 10/2006 |
| JP | 2006-350372 A | 12/2006 |
| JP | 2007243550 A | 9/2007 |
| JP | 2010042703 A | 2/2010 |
| WO | 2001044850 A2 | 6/2001 |
| WO | 2004010679 A2 | 1/2004 |
| WO | 2006029995 A1 | 3/2006 |
| WO | 2006029996 A1 | 3/2006 |
| WO | 2007053404 A2 | 5/2007 |
| WO | 2008024639 A2 | 2/2008 |
| WO | 2008127752 A2 | 10/2008 |
| WO | 2009046268 A1 | 4/2009 |
| WO | 2011111465 A1 | 9/2011 |
| WO | 2013019795 A1 | 2/2013 |
| WO | 2013081984 A1 | 6/2013 |
| WO | 2013081985 A1 | 6/2013 |
| WO | 2013123161 A1 | 8/2013 |

* cited by examiner

VEHICULAR VISION SYSTEM WITH WINDSHIELD MOUNTED CAMERA

CROSS REFERENCE TO RELATED APPLICATIONS

The present application is a continuation of U.S. patent application Ser. No. 17/305,254, filed Jul. 2, 2021, now U.S. Pat. No. 11,427,136, which is a continuation of U.S. patent application Ser. No. 17/247,269, filed Dec. 7, 2020, now U.S. Pat. No. 11,052,834, which is a continuation of U.S. patent application Ser. No. 16/948,878, filed Oct. 5, 2020, now U.S. Pat. No. 10,857,953, which is a continuation of U.S. patent application Ser. No. 16/806,095, filed Mar. 2, 2020, now U.S. Pat. No. 10,793,086, which is a continuation of U.S. patent application Ser. No. 16/449,546, filed Jun. 24, 2019, now U.S. Pat. No. 10,576,909, which is a continuation of U.S. patent application Ser. No. 16/117,105, filed Aug. 30, 2018, now U.S. Pat. No. 10,328,868, which is a continuation of U.S. patent application Ser. No. 15/878,579, filed Jan. 24, 2018, now U.S. Pat. No. 10,065,575, which is a continuation of U.S. patent application Ser. No. 15/494,646, filed Apr. 24, 2017, now U.S. Pat. No. 9,878,679, which is a continuation of U.S. patent application Ser. No. 15/180,643, filed Jun. 13, 2016, now U.S. Pat. No. 9,630,570, which is a continuation of U.S. patent application Ser. No. 14/112,343, filed Oct. 17, 2013, now U.S. Pat. No. 9,380,219, which is a 371 national phase filing of PCT/US12/34236, filed Apr. 19, 2012, which claims the filing benefit of U.S. provisional application Ser. No. 61/477,315, filed Apr. 20, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, that may be processed by an image processor, such as for a headlamp control or other machine vision system, or that may be displayed at a display screen that is viewable by the driver of the vehicle.

According to an aspect of the present invention, a vision system for a vehicle includes a camera or image sensor disposed at a windshield of a vehicle and having a field of view forward of the vehicle and through the windshield of the vehicle, and a processor operable to process data transmitted by the camera. The vision system or camera assembly or system includes an angular filter disposed at or near the windshield forward of the camera. The angular filter comprises a substantially transparent film that limits reflection of light through an angular range that generally corresponds to the stray light that reflects off of the vehicle (such as off of the vehicle dashboard) and would otherwise impinge the camera lens aperture.

The camera is electrically connected to circuitry established at a circuit board that is mounted generally along the windshield behind the camera, and the camera preferably is electrically connected to the circuitry via a flexible electrical connector. The flexible electrical connector flexes to allow a viewing angle of the camera to be adjusted relative to a mounting angle of the circuit board.

Therefore, the present invention provides an angular light filter that rejects or substantially rejects or attenuates reflections from the vehicle dash board into the camera. The angular filter replaces the stray light cone or shroud of a typical module or housing, allowing greater flexibility and lower mounting of the camera at the windshield.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward (or rearward) direction.

Figure 1:
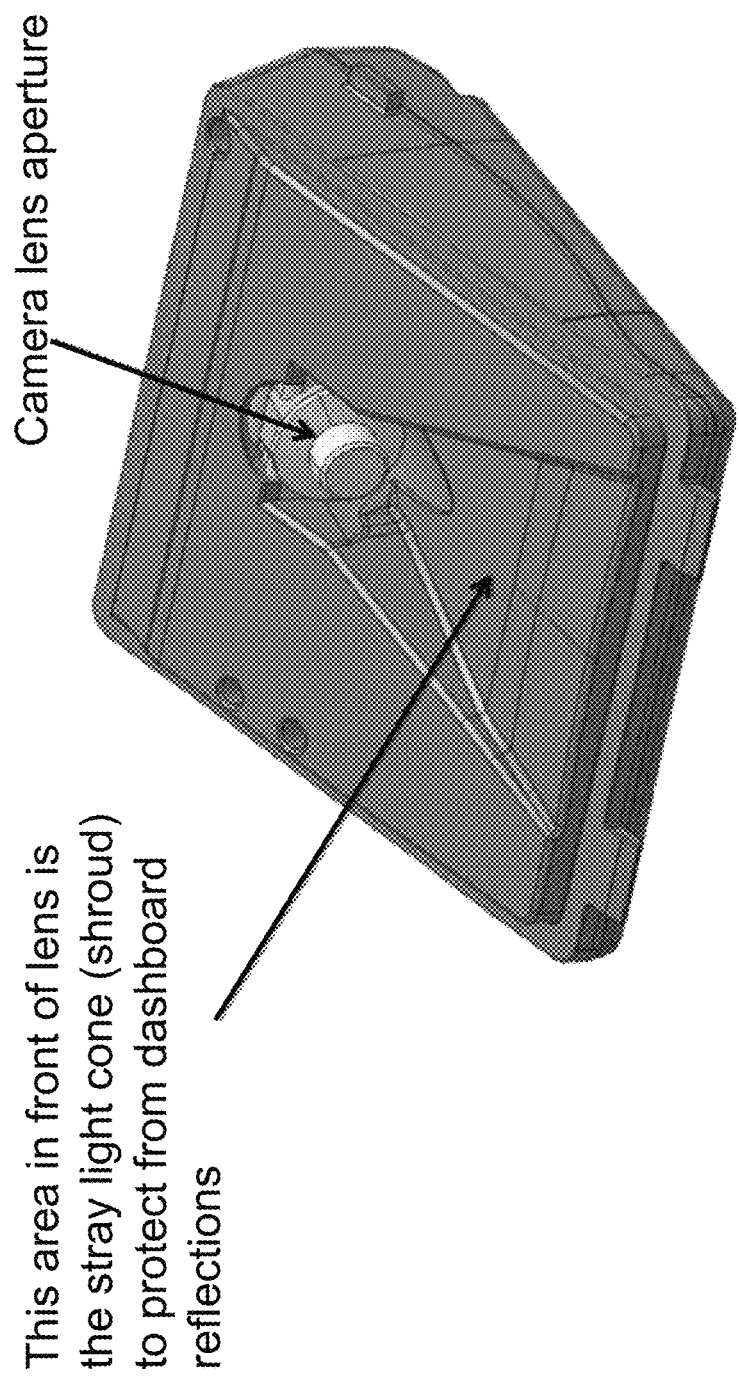
FIG. 1 is a perspective view of a camera disposed at a module that attaches at an interior surface of a vehicle windshield and that includes a stray light cone in front of the camera as part of the module or housing.
Figure 2:
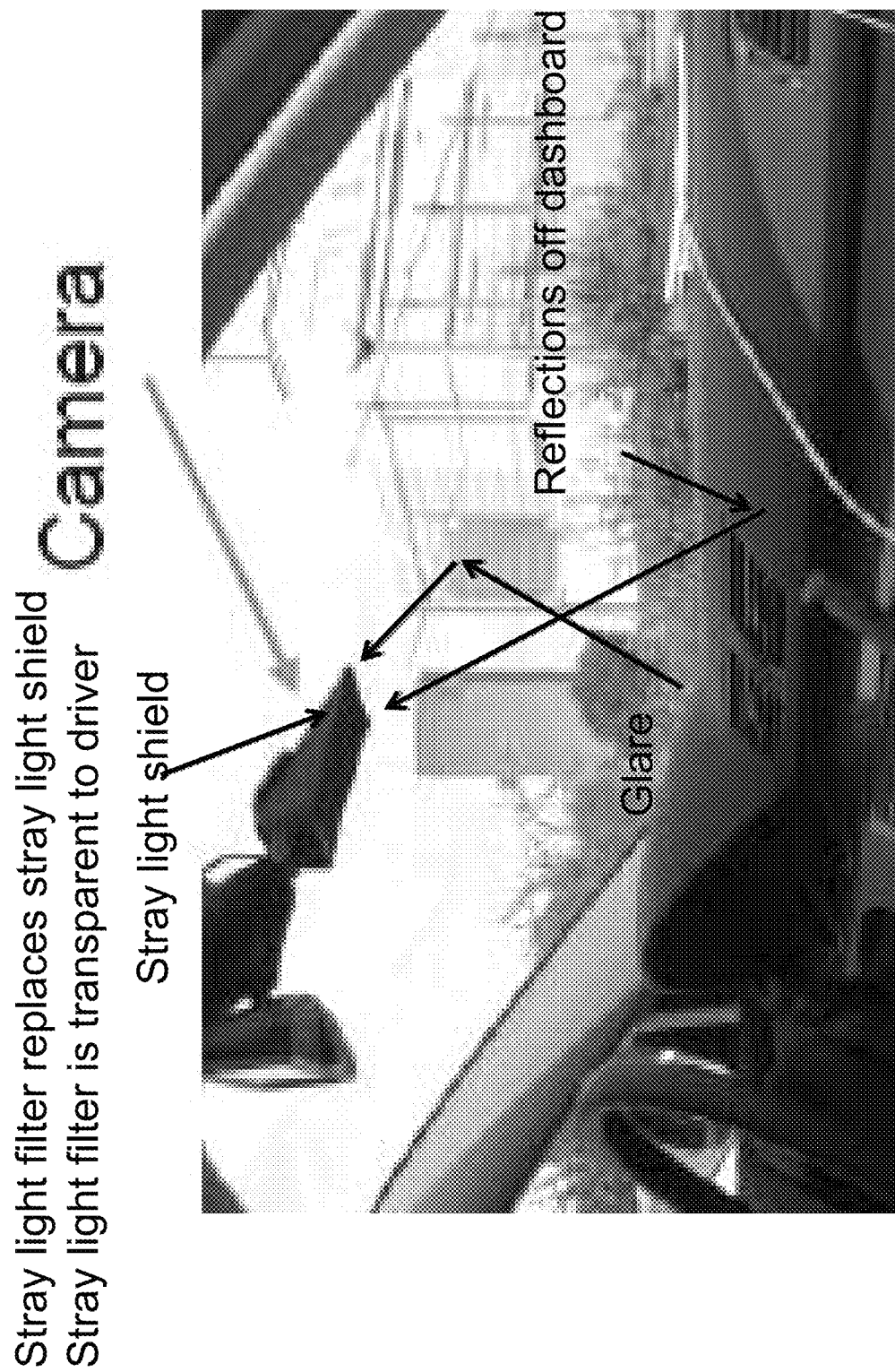
FIG. 2 is a perspective view of the camera module of FIG. 1, shown with the module mounted at a vehicle windshield with the stray light cone extending forward from the camera and along the windshield.

Front facing vehicular cameras include optical elements that constitute the camera. These elements are typically mounted in a vehicular camera housing, such as a windshield electronics module housing or the like, such as shown in FIGS. 1 and 2 (and such as a housing that utilizes aspects of the vision systems described in U.S. Pat. Nos. 7,526,103; 7,480,149; 7,188,963; 6,824,281; 6,341,523; 6,250,148; 6,516,664 and/or 6,968,736, which are hereby incorporated herein by reference in their entireties). As can be seen with reference to FIGS. 1 and 2, the housing may extend forward of the camera lens aperture and includes a stray light cone or shroud which serves to insulate the camera lens aperture from stray light that arises from reflections off the dashboard and/or windshield. Such housings are typically relatively bulky compared to the optical elements of the camera and thus the housing may occupy a considerable amount of windshield real estate or space. It thus may be desirable to eliminate the housing, or at least minimize the extent of the camera housing, so as to free up space on the windshield. This would not only provide better aesthetics, but also increased visibility through the windshield for the driver of the vehicle.

Figure 3:
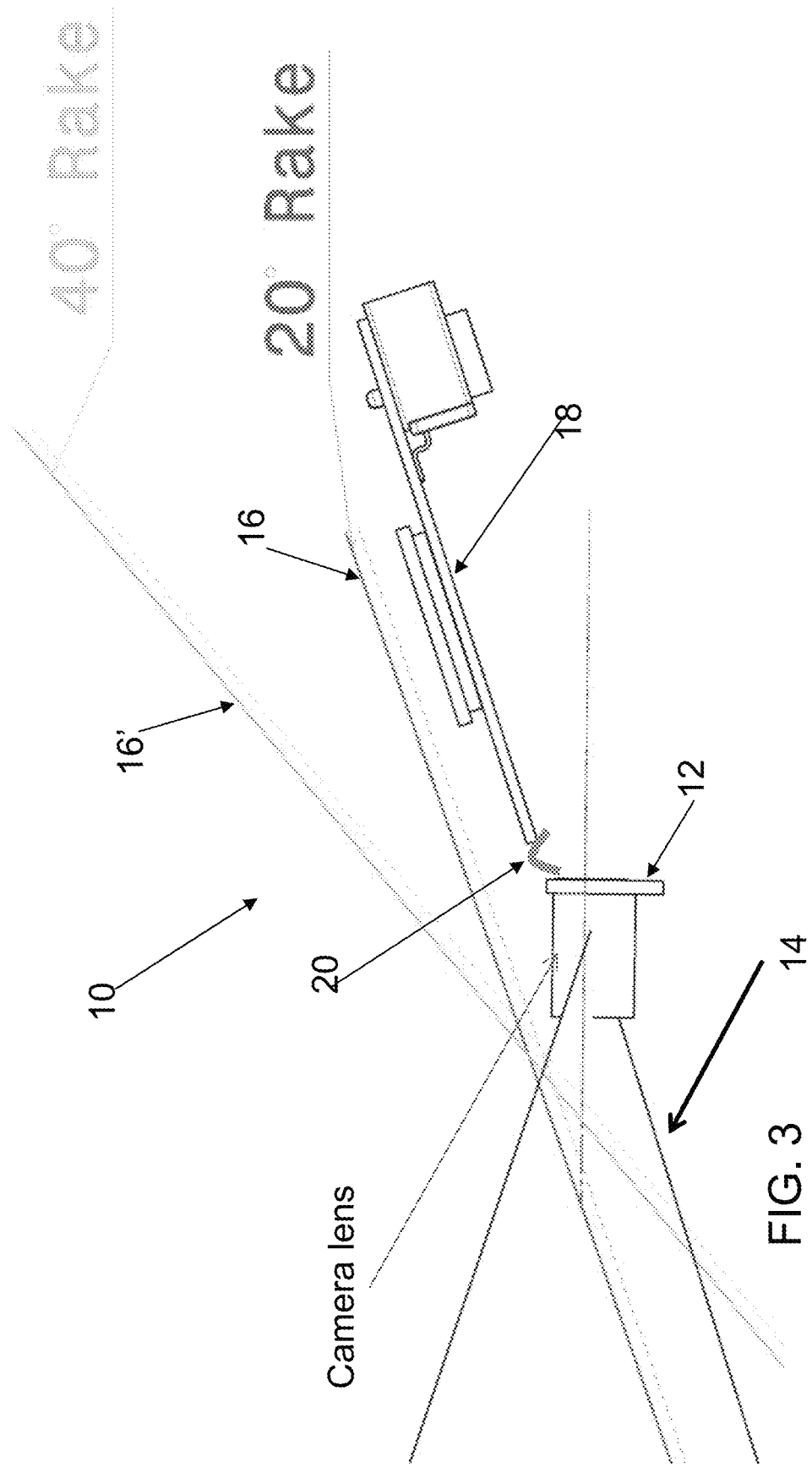
FIG. 3 is a sectional view of a camera assembly or system with an angular light filter disposed along the windshield in front of the camera in accordance with the present invention.

As shown in FIG. 3, the present invention proposes to eliminate the stray light cone or shroud and minimize the camera housing so that the housing only contains the optical elements of the camera and any necessary interfacing elements. At the very least, the present invention seeks to eliminate the stray light cone or shroud so that there is a minimum of the camera housing projecting forward of the camera lens aperture. Instead of a stray light cone or shroud, the camera or vision system 10 of the present invention includes a camera 12, with an angular filter 14 placed on or near the windshield 16 forward of the camera 12 and the camera lens aperture (and not part of or incorporated in a camera housing of a windshield electronics module or the like). The angular filter 14 comprises a transparent (or substantially transparent or light transmitting) or see-through film, which limits or substantially precludes reflection of light through an angular range corresponding to the stray light that would otherwise impinge the camera lens aperture.

The angular filter 14 may comprise any suitable materials. For example, a suitable film material may be found on the likes of computer notebook screens and other types of display monitors and are commercially available from the 3M Company and other suppliers. In some embodiments, the filter may be placed directly on the windshield, and in other embodiments (and such as shown in FIG. 3) the filter may be spaced apart from the windshield surface on a plane just below the camera lens aperture, in which case the filter may be mounted on a transparent substrate (not shown) or the like. Optionally, the filter may be provided in the form of anti-reflective coating on the windshield, which acts to prevent reflections from the windshield.

With the proposed structure, the designer of the camera system or vision system is afforded a great deal of design flexibility. In particular, and as can be seen with reference to FIG. 3, it will be appreciated that the printed circuit board 18 and other electronic components may be housed and disposed rearward of the camera optical elements and placed higher up on or along or near the windshield or even hidden all together under the vehicle roof liner.

Optionally, and as shown in FIG. 3, a flexible coupling 20 may also be provided between the small camera 12 and the printed circuit board 18. With such a flexible coupling (which electrically connects circuitry of the circuit board with circuitry of the camera to power and/or control the camera and to receive image data from the camera), the present invention may provide a universal or substantially universal solution to many vehicles which may all have different windshield rake angles. For example, and as can be seen with reference to FIG. 3, the flexible coupling 20 may flex to allow the camera 12 to be arranged generally horizontally when the circuit board 18 is mounted along (and generally parallel to) the windshield 16, such as, for example, along a windshield that has a rake angle of about 20 degrees, and the flexible coupling 20 may be adjusted or flexed to allow the camera 12 to be arranged generally horizontally when the circuit board 18 is mounted along a different windshield 16', such as, for example, along a windshield that has a rake angle of about 40 degrees. The flexible electrical connector thus flexes to allow a viewing angle of the camera to be adjusted relative to a mounting angle of the circuit board, depending on the particular vehicle application of the camera system. Thus, a common camera assembly or system 10 may be provided that may readily be adapted or configured for application to vehicles with different windshield angles (with the flexible coupling or flex connection allowing for adjustment of the angular tilt or relative angles between the camera and lens axis and the circuit board), without requiring additional mounting bracketry and the like to adapt the assembly to the particular vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/565,713, filed Dec. 1, 2011; and/or Ser. No. 61/563,965, filed Nov. 28, 2011, which are hereby incorporated herein by reference in their entireties.

As disclosed in U.S. provisional application Ser. No. 61/565,713, filed Dec. 1, 2011 (incorporated herein by reference in its entirety), the vehicle includes a display device operable to display images for viewing by a driver of the vehicle. The camera can provide almost raw image data to the display device and has a control channel for a data line (which might be any kind of data line or bus), and wherein a graphics engine runs as a routine at the display device (with, for example, the graphics engine running as a routine on a head unit of the vehicle). The camera may be part of an automotive vision system, which uses LVDS as a bidirectional control channel and an image data transfer channel and comprising an automotive vision multi camera architecture, where all cameras are controlled by one control/image data processing device, and where an image data processing device sends processed image data to the head unit or other display device and with the system processing image data captured by more than one camera and by other driver assistant system sources such as ultrasound sensors, radar sensors, infrared and visual cameras, lidar or laser sensors. The automotive vision system may use LVDS data decoders. A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle. The object detection may utilize detection and analysis of moving vectors representative of objects detected in the field of view of the vehicle camera, in order to determine which detected objects are objects of interest to the driver of the vehicle. An image data stream from the camera to the head unit (or other end device) is realized on a data encoder chip, preferably by a Low Voltage Differential Signal (LVDS) or Ethernet interface, preferably using a mono coaxial cable and LVDS/Ethernet encoder chips (in the camera and in the head unit). The data stream can be mono-directional. Optionally, a control line may be realized by a CAN/LIN/other car bus interface or just by a single signal line/wire. Optionally, the control signal may be transferred via the data encoder chip, preferably by LVDS, so the interfaces and data stream are bi-directional.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system (utilizing a forward and/or rearward facing camera and other cameras disposed at the vehicle with exterior fields of view) and/or the camera or cameras as part of a vehicle vision system comprising or utilizing a plurality of cameras (such as utilizing a rearward facing camera and sidewardly facing cameras and a forwardly facing camera disposed at the vehicle), may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:

a camera module configured for mounting at an in-cabin portion of a windshield of a vehicle;

wherein said camera module comprises a forward-viewing camera and a circuit board;

wherein, with said camera module mounted at the in-cabin portion of the windshield, said forward-viewing camera views forward of the vehicle and through the windshield of the vehicle;

wherein said forward-viewing camera comprises a CMOS imaging sensor array and a lens;

wherein the CMOS imaging sensor array comprises a plurality of photosensor elements arranged in a photosensor array having rows and columns;

wherein said lens is accommodated in a lens barrel having a longitudinal axis;

a data processor operable to process image data captured by the CMOS imaging sensor array of said forward-viewing camera for at least (i) a vehicle headlamp control system of the vehicle, (ii) a lane departure warning system of the vehicle, (iii) an object detection system of the vehicle and (iv) a traffic sign recognition system of the vehicle;

wherein the CMOS imaging sensor array of said forward-viewing camera is electrically connected to circuitry of said circuit board via a flexible electrical connection;

wherein the CMOS imaging sensor array of said forward-viewing camera is controlled via the flexible electrical connection;

wherein image data captured by the CMOS imaging sensor array is carried via the flexible electrical connection; and wherein, with said camera module mounted at the in-cabin portion of the windshield, said circuit board is tilted at an acute angle relative to the longitudinal axis of said lens barrel of said forward-viewing camera.

2. The vehicular vision system of claim 1, wherein image data captured by the CMOS imaging sensor array of said forward-viewing camera is carried as a data stream from said camera module via a coaxial cable.

3. The vehicular vision system of claim 1, wherein image data captured by the CMOS imaging sensor array of said forward-viewing camera is carried as a data stream from said camera module via Ethernet.

4. The vehicular vision system of claim 1, wherein the windshield of the vehicle, as mounted in the vehicle, has a rake angle of at least 20 degrees.

5. The vehicular vision system of claim 4, wherein the rake angle of the windshield of the vehicle is less than 40 degrees.

6. The vehicular vision system of claim 4, wherein, with said camera module mounted at the in-cabin portion of the windshield, the longitudinal axis of said lens barrel of said forward-viewing camera is at or close to horizontal.

7. The vehicular vision system of claim 6, wherein, with said camera module mounted at the in-cabin portion of the windshield, said circuit board subtends an angle relative to the in-cabin portion of the windshield that is less than an angle subtended by the longitudinal axis of said lens barrel of said forward-viewing camera relative to the in-cabin portion of the windshield.

8. The vehicular vision system of claim 6, wherein, with said camera module mounted at the in-cabin portion of the windshield, said circuit board subtends an angle relative to horizontal that is greater than an angle subtended by the longitudinal axis of said lens barrel of said forward-viewing camera relative to horizontal.

9. The vehicular vision system of claim 1, wherein, with said camera module mounted at the in-cabin portion of the windshield, at least a portion of said circuit board is disposed at the windshield rearward of said lens of said forward-viewing camera.

10. The vehicular vision system of claim 1, wherein the data processor is located in the vehicle remote from said camera module.

11. The vehicular vision system of claim 10, wherein the vehicle is equipped with at least one other camera, and wherein image data captured the at least one other camera is provided to and is processed by the data processor.

12. The vehicular vision system of claim 10, wherein the vehicle is equipped with at least one radar, and wherein data captured the at least one radar is provided to and is processed by the data processor.

13. The vehicular vision system of claim 1, wherein said forward-viewing camera views forward of the vehicle and through the windshield of the vehicle via a stray light shroud.

14. The vehicular vision system of claim 1, wherein said forward-viewing camera views forward of the vehicle and through the windshield of the vehicle via an angular filter.

15. The vehicular vision system of claim 1, wherein the data processor operable to process image data comprises an image processor.

16. The vehicular vision system of claim 15, wherein said image processor is disposed within said camera module.

17. The vehicular vision system of claim 16, wherein circuitry of said circuit board comprises said image processor.

18. The vehicular vision system of claim 1, wherein processing by the data processor of image data captured by said forward-viewing camera detects objects at or near the vehicle and in a predicted path of the vehicle.

19. The vehicular vision system of claim 18, wherein processing by the data processor of image data captured by said forward-viewing camera that detects objects at or near the vehicle and in the predicted path of the vehicle utilizes analysis of moving vectors representative of objects detected in a field of view of said forward-viewing camera in order to determine which detected objects are objects of interest to a driver of the vehicle.

20. The vehicular vision system of claim 1, wherein image data captured by the CMOS imaging sensor array of said forward-viewing camera is encoded by a data encoder chip.

21. The vehicular vision system of claim 20, wherein image data captured by the CMOS imaging sensor array of said forward-viewing camera that is encoded by the data encoder chip is carried as a data stream from said camera module via a coaxial cable.

22. The vehicular vision system of claim 20, wherein image data captured by the CMOS imaging sensor array of said forward-viewing camera that is encoded by the data encoder chip is carried as a data stream from said camera module utilizing Low Voltage Differential Signaling (LVDS).

23. The vehicular vision system of claim 22, wherein the data stream is carried via a coaxial cable.

24. The vehicular vision system of claim 22, wherein the data stream is carried via Ethernet.

25. The vehicular vision system of claim 20, wherein the data encoder chip comprises an LVDS encoder chip.

26. The vehicular vision system of claim 20, wherein the data encoder chip comprises an Ethernet encoder chip.

27. A vehicular vision system, said vehicular vision system comprising:

a camera module configured for mounting at an in-cabin portion of a windshield of a vehicle;

wherein said camera module comprises a forward-viewing camera and a circuit board;

wherein, with said camera module mounted at the in-cabin portion of the windshield, said forward-viewing camera views forward of the vehicle and through the windshield of the vehicle;

wherein said forward-viewing camera comprises a CMOS imaging sensor array and a lens;

wherein the CMOS imaging sensor array comprises a plurality of photosensor elements arranged in a photosensor array having rows and columns;

wherein said lens is accommodated in a lens barrel having a longitudinal axis;

a data processor operable to process image data captured by the CMOS imaging sensor array of said forward-viewing camera for at least an object detection system of the vehicle;

wherein processing by the data processor of image data captured by said forward-viewing camera detects objects in a predicted path of the vehicle in order to determine which detected objects are objects of interest to a driver of the vehicle;

wherein the data processor is located in the vehicle remote from said camera module;

wherein the vehicle is equipped with at least one other camera, and wherein image data captured the at least one other camera is provided to and is processed by the data processor;

wherein the CMOS imaging sensor array of said forward-viewing camera is electrically connected to circuitry of said circuit board via a flexible electrical connection;

wherein image data captured by the CMOS imaging sensor array is carried via the flexible electrical connection; and wherein, with said camera module mounted at the in-cabin portion of the windshield, said circuit board is tilted at an acute angle relative to the longitudinal axis of said lens barrel of said forward-viewing camera.

28. The vehicular vision system of claim 27, wherein image data captured by the CMOS imaging sensor array of said forward-viewing camera is carried as a data stream from said camera module via a coaxial cable.

29. The vehicular vision system of claim 28, wherein the CMOS imaging sensor array of said forward-viewing camera is controlled via the flexible electrical connection.

30. The vehicular vision system of claim 27, wherein image data captured by the CMOS imaging sensor array of said forward-viewing camera is carried as a data stream from said camera module via Ethernet.

31. The vehicular vision system of claim 27, wherein the windshield of the vehicle, as mounted in the vehicle, has a rake angle of at least 20 degrees.

32. The vehicular vision system of claim 31, wherein the rake angle of the windshield of the vehicle is less than 40 degrees.

33. The vehicular vision system of claim 31, wherein, with said camera module mounted at the in-cabin portion of the windshield, the longitudinal axis of said lens barrel of said forward-viewing camera is at or close to horizontal.

34. The vehicular vision system of claim 27, wherein, with said camera module mounted at the in-cabin portion of the windshield, said circuit board subtends an angle relative to the in-cabin portion of the windshield that is less than an angle subtended by the longitudinal axis of said lens barrel of said forward-viewing camera relative to the in-cabin portion of the windshield.

35. The vehicular vision system of claim 27, wherein, with said camera module mounted at the in-cabin portion of the windshield, said circuit board subtends an angle relative to horizontal that is greater than an angle subtended by the longitudinal axis of said lens barrel of said forward-viewing camera relative to horizontal.

36. The vehicular vision system of claim 27, wherein, with said camera module mounted at the in-cabin portion of the windshield, at least a portion of said circuit board is disposed at the windshield rearward of said lens of said forward-viewing camera.

37. The vehicular vision system of claim 27, wherein the vehicle is equipped with at least one radar, and wherein data captured the at least one radar is provided to and is processed by the data processor.

38. The vehicular vision system of claim 27, wherein said forward-viewing camera views forward of the vehicle and through the windshield of the vehicle via a stray light shroud.

39. The vehicular vision system of claim 27, wherein said forward-viewing camera views forward of the vehicle and through the windshield of the vehicle via an angular filter.

40. The vehicular vision system of claim 27, wherein the data processor operable to process image data comprises an image processor.

41. The vehicular vision system of claim 40, wherein processing by the data processor of image data captured by said forward-viewing camera that detects objects in the predicted path of the vehicle utilizes analysis of moving vectors representative of objects detected in a field of view of said forward-viewing camera in order to determine which detected objects are objects of interest to a driver of the vehicle.

42. The vehicular vision system of claim 27, wherein image data captured by the CMOS imaging sensor array of said forward-viewing camera is encoded by a data encoder chip.

43. The vehicular vision system of claim 42, wherein image data captured by the CMOS imaging sensor array of said forward-viewing camera that is encoded by the data encoder chip is carried as a data stream from said camera module via a coaxial cable.

44. The vehicular vision system of claim 42, wherein image data captured by the CMOS imaging sensor array of said forward-viewing camera that is encoded by the data encoder chip is carried as a data stream from said camera module utilizing Low Voltage Differential Signaling (LVDS).

45. The vehicular vision system of claim 44, wherein the data stream is carried via a coaxial cable.

46. The vehicular vision system of claim 44, wherein the data stream is carried via Ethernet.

47. The vehicular vision system of claim 42, wherein the data encoder chip comprises an LVDS encoder chip.

48. The vehicular vision system of claim 42, wherein the data encoder chip comprises an Ethernet encoder chip.

49. The vehicular vision system of claim 27, wherein the data processor is operable to process image data captured by the CMOS imaging sensor array of said forward-viewing camera for at least (i) a vehicle headlamp control system of the vehicle and (ii) a lane departure warning system of the vehicle.

50. The vehicular vision system of claim 49, wherein the data processor is operable to process image data captured by the CMOS imaging sensor array of said forward-viewing camera for a traffic sign recognition system of the vehicle.

51. A vehicular vision system, said vehicular vision system comprising:

a camera module configured for mounting at an in-cabin portion of a windshield of a vehicle;

wherein said camera module comprises a forward-viewing camera and a circuit board;

wherein, with said camera module mounted at the in-cabin portion of the windshield, said forward-viewing camera views forward of the vehicle and through the windshield of the vehicle;

wherein said forward-viewing camera comprises a CMOS imaging sensor array and a lens;

wherein the CMOS imaging sensor array comprises a plurality of photosensor elements arranged in a photosensor array having rows and columns;

wherein said lens is accommodated in a lens barrel having a longitudinal axis;

a data processor operable to process image data captured by the CMOS imaging sensor array of said forward-viewing camera for at least an object detection system of the vehicle;

wherein processing by the data processor of image data captured by said forward-viewing camera detects objects in a predicted path of the vehicle in order to determine which detected objects are objects of interest to a driver of the vehicle;

wherein the data processor operable to process image data comprises an image processor disposed on said circuit board within said camera module;

wherein the CMOS imaging sensor array of said forward-viewing camera is electrically connected to circuitry of said circuit board via a flexible electrical connection;

wherein image data captured by the CMOS imaging sensor array is carried via the flexible electrical connection; and wherein, with said camera module mounted at the in-cabin portion of the windshield, said circuit board is tilted at an acute angle relative to the longitudinal axis of said lens barrel of said forward-viewing camera.

52. The vehicular vision system of claim 51, wherein image data captured by the CMOS imaging sensor array of said forward-viewing camera is carried as a data stream from said camera module via a coaxial cable.

53. The vehicular vision system of claim 52, wherein, with said camera module mounted at the in-cabin portion of the windshield, at least a portion of said circuit board is disposed at the windshield rearward of said lens of said forward-viewing camera.

54. The vehicular vision system of claim 52, wherein said forward-viewing camera views forward of the vehicle and through the windshield of the vehicle via a stray light shroud.

55. The vehicular vision system of claim 52, wherein said forward-viewing camera views forward of the vehicle and through the windshield of the vehicle via an angular filter.

56. The vehicular vision system of claim 51, wherein image data captured by the CMOS imaging sensor array of said forward-viewing camera is carried as a data stream from said camera module via Ethernet.

57. The vehicular vision system of claim 51, wherein the windshield of the vehicle, as mounted in the vehicle, has a rake angle of at least 20 degrees.

58. The vehicular vision system of claim 57, wherein the rake angle of the windshield of the vehicle is less than 40 degrees.

59. The vehicular vision system of claim 57, wherein, with said camera module mounted at the in-cabin portion of the windshield, the longitudinal axis of said lens barrel of said forward-viewing camera is at or close to horizontal.

60. The vehicular vision system of claim 51, wherein, with said camera module mounted at the in-cabin portion of the windshield, said circuit board subtends an angle relative to the in-cabin portion of the windshield that is less than an angle subtended by the longitudinal axis of said lens barrel of said forward-viewing camera relative to the in-cabin portion of the windshield.

61. The vehicular vision system of claim 51, wherein, with said camera module mounted at the in-cabin portion of the windshield, said circuit board subtends an angle relative to horizontal that is greater than an angle subtended by the longitudinal axis of said lens barrel of said forward-viewing camera relative to horizontal.

62. The vehicular vision system of claim 51, wherein processing by the data processor of image data captured by said forward-viewing camera that detects objects in the predicted path of the vehicle utilizes analysis of moving vectors representative of objects detected in a field of view of said forward-viewing camera in order to determine which detected objects are objects of interest to a driver of the vehicle.

63. The vehicular vision system of claim 51, wherein image data captured by the CMOS imaging sensor array of said forward-viewing camera is encoded by a data encoder chip.

64. The vehicular vision system of claim 63, wherein the CMOS imaging sensor array of said forward-viewing camera is controlled via the flexible electrical connection.

65. The vehicular vision system of claim 63, wherein image data captured by the CMOS imaging sensor array of said forward-viewing camera that is encoded by the data encoder chip is carried as a data stream from said camera module via a coaxial cable.

66. The vehicular vision system of claim 63, wherein the data encoder chip comprises an LVDS encoder chip.

67. The vehicular vision system of claim 63, wherein the data encoder chip comprises an Ethernet encoder chip.

68. The vehicular vision system of claim 63, wherein image data captured by the CMOS imaging sensor array of said forward-viewing camera that is encoded by the data encoder chip is carried as a data stream from said camera module utilizing Low Voltage Differential Signaling (LVDS).

69. The vehicular vision system of claim 68, wherein the data stream is carried via a coaxial cable.

70. The vehicular vision system of claim 68, wherein the data stream is carried via Ethernet.

71. The vehicular vision system of claim 51, wherein the data processor is operable to process image data captured by the CMOS imaging sensor array of said forward-viewing camera for at least (i) a vehicle headlamp control system of the vehicle and (ii) a lane departure warning system of the vehicle.

72. The vehicular vision system of claim 71, wherein the data processor is operable to process image data captured by the CMOS imaging sensor array of said forward-viewing camera for a traffic sign recognition system of the vehicle.

* * * * *